United States Patent
Vietz et al.

(10) Patent No.: US 9,089,847 B2
(45) Date of Patent: Jul. 28, 2015

(54) POLYCRYSTALLINE SILICON

(71) Applicant: Wacker Chemie AG, Munich (DE)

(72) Inventors: Matthias Vietz, Mattighofen (AT); Reiner Pech, Neuoetting (DE)

(73) Assignee: Wacker Chemie AG, Munich (DE)

( * ) Notice: Subject to any disclaimer, the term of this patent is extended or adjusted under 35 U.S.C. 154(b) by 198 days.

(21) Appl. No.: 13/893,855

(22) Filed: May 14, 2013

(65) Prior Publication Data

US 2013/0309524 A1  Nov. 21, 2013

(30) Foreign Application Priority Data

May 21, 2012 (DE) .......................... 10 2012 208 473

(51) Int. Cl.

| | | |
|---|---|---|
| B65B 1/30 | (2006.01) | |
| B02C 19/18 | (2006.01) | |
| B07B 9/02 | (2006.01) | |
| B65B 1/06 | (2006.01) | |
| B65B 1/04 | (2006.01) | |
| B65B 63/00 | (2006.01) | |
| B02C 23/08 | (2006.01) | |
| B65D 30/00 | (2006.01) | |
| C01B 33/02 | (2006.01) | |
| B65B 55/24 | (2006.01) | |
| B65B 1/32 | (2006.01) | |

(52) U.S. Cl.
CPC . *B02C 23/08* (2013.01); *B65B 1/32* (2013.01); *B65B 55/24* (2013.01); *B65D 31/00* (2013.01); *C01B 33/02* (2013.01); *Y10T 428/12674* (2015.01)

(58) Field of Classification Search
CPC .............. B65B 1/04; B65B 1/06; B65B 1/08; B65B 1/10; B65B 1/12; B65B 63/00; B65B 1/28
USPC ............. 53/58, 504, 121, 238, 428, 435, 434, 53/111 R, 512, 513; 428/641
See application file for complete search history.

(56) References Cited

U.S. PATENT DOCUMENTS

| | | | |
|---|---|---|---|
| 7,013,620 B2 * | 3/2006 | Holzlwimmer et al. | ........ 53/449 |
| 8,021,483 B2 | 9/2011 | Arvidson et al. | |
| 8,074,905 B2 | 12/2011 | Schaefer et al. | |
| 8,747,794 B2 * | 6/2014 | Pech et al. | .................... 423/348 |
| 2009/0056279 A1 | 3/2009 | Sasaki | |
| 2010/0001106 A1 | 1/2010 | Schaefer et al. | |
| 2010/0154357 A1 * | 6/2010 | Wochner et al. | ................ 53/405 |
| 2011/0286906 A1 * | 11/2011 | Arvidson et al. | ............ 423/348 |
| 2012/0052297 A1 | 3/2012 | Pech et al. | |
| 2013/0269295 A1 * | 10/2013 | Mattes et al. | ................... 53/428 |
| 2014/0130455 A1 * | 5/2014 | Lazarus et al. | ................. 53/428 |

FOREIGN PATENT DOCUMENTS

| | | |
|---|---|---|
| DE | 3221436 C2 | 6/1984 |
| DE | 3640520 A1 | 6/1988 |
| DE | 102007027110 A1 | 12/2008 |
| EP | 1842595 A1 | 10/2007 |
| EP | 2030905 A2 | 3/2009 |
| GB | 2121755 A | 1/1984 |

OTHER PUBLICATIONS

PatBase abstract for DE 3640520 A1.

* cited by examiner

*Primary Examiner* — Andrew M Tecco
*Assistant Examiner* — Praachi M Pathak
(74) *Attorney, Agent, or Firm* — Caesar Rivise, PC

(57) ABSTRACT

Polycrystalline silicon in the form of chunks packed in plastic bags containing a mass of at least 5 kg, including chunks of size from 20 to 200 mm, wherein any fines fraction in the plastic bag is less than 900 ppmw, preferably less than 300 ppmw, more preferably less than 10 ppmw. The polycrystalline silicon, after comminution of a silicon rod obtained by CVD (Siemens process), is sorted and classified, optionally dedusted and then metered and packed. Metering and packing units include elements for removing fines or small particles during metering and during packing. The packing unit includes an energy absorber or a reservoir vessel which enables sliding or slipping of the silicon chunks into the plastic bag. Gas flow generated within the plastic bag after the bag has been filled transports the dust or small particles out of the bag, and these are sucked out with a suction device.

6 Claims, No Drawings

POLYCRYSTALLINE SILICON

BACKGROUND OF THE INVENTION

The invention relates to polycrystalline silicon.

Polycrystalline silicon, referred to hereinafter as polysilicon, serves, inter alia, as a starting material for the production of electronic components and solar cells.

It is obtained by thermal decomposition of a silicon-containing gas or of a silicon-containing gas mixture. This operation is referred to as deposition from the vapor phase (CVD, chemical vapor deposition).

This process is implemented on a large scale in what are called Siemens reactors. The polysilicon is obtained here in the form of rods. The polysilicon rods are generally comminuted by means of manual processes.

There are a number of known machine processes in which manually precrushed coarse chunk polysilicon is comminuted further using customary crushers. Mechanical crushing processes are described, for example, in U.S. Pat. No. 8,021,483 B2.

U.S. Pat. No. 8,074,905 discloses an apparatus comprising a device for feeding coarse chunk polysilicon into a crusher unit, the crusher unit and a sorting unit for classifying the chunk polysilicon, wherein the crusher unit is provided with a control system which enables variable adjustment of at least one crushing parameter in the crusher unit and/or of at least one sorting parameter in the sorting unit.

For applications in the semiconductor and solar industries, chunk polysilicon with minimum contamination is desirable. In order to accomplish this, various cleaning methods are also used.

US 2010/0001106 A1 describes a method for producing highly pure classified polysilicon fragments, comprising comminuting polysilicon from the Siemens method into fragments by means of a device comprising comminution tools and classifying the fragments by a screening device, and cleaning the polysilicon fragments thus obtained in a cleaning bath, wherein the comminution tools and the screening device have surfaces which contact the polysilicon and contaminate the polysilicon fragments only with extraneous particles that are subsequently removable selectively by the cleaning bath.

Silicon dust adhering to the chunks is also regarded as contamination since it reduces the yield in crystal pulling.

US 2012/0052297 A1 discloses a process for producing polycrystalline silicon, comprising crushing of polycrystalline silicon deposited on thin rods in a Siemens reactor into chunks, classifying the chunks into size classes of about 0.5 mm to greater than 45 mm and treating the chunks by means of compressed air or dry ice in order to remove silicon dust from the chunks, with no chemical wet cleaning operation.

However, the polycrystalline silicon, after the comminution steps and the optionally performed cleaning or dedusting operation, has to be packed before it is transported to the customer.

Accordingly, in the course of packing, it has to be ensured that this is effected with minimum contamination.

Typically, chunk polysilicon for the electronics industry is packed in 5 kg bags having a mass tolerance of +/−max. 50 g. For the solar industry, chunk polysilicon in bags containing a mass of 10 kg with a mass tolerance of +/−max. 100 g is standard.

Tubular bag machines suitable in principle for packing chunk silicon are commercially available. A corresponding packing machine is described, for example, in DE 36 40 520 A1.

However, chunk polysilicon is a sharp-edged, non-free-flowing bulk material having a weight of the individual silicon chunks of up to 2500 g. Therefore, in the course of packing, it has to be ensured that the material does not penetrate, or in the worst case even completely destroy, the standard plastic bags in the course of filling.

In order to prevent this, the commercial packing machines have to be modified in a suitable manner for the purpose of packing polysilicon.

U.S. Pat. No. 7,013,620 B2 discloses an apparatus for the cost-effective, fully automatic transportation, weighing, portioning, filling and packaging of high-purity polysilicon fragments, comprising a conveyor channel for the polysilicon fragments, a weighing device for the polysilicon fragments connected to a hopper, deflection plates made from silicon, a first filling device which forms a plastic bag from a highly pure plastic film, comprising a deionizer which prevents static charging and therefore contamination of the plastic film with particles, a welding device for the plastic bag filled with polysilicon fragments, a flowbox which is fitted above the conveyor channel, weighing device, filling device and welding device and which prevents contamination of the polysilicon fragments by particles, a conveyor belt with a magnetically inductive detector for the welded plastic bag filled with polysilicon chunks, all the components which come into contact with the polysilicon fragments being sheathed with silicon or clad with a highly wear-resistant plastic.

It has been found that, in such apparatuses, jamming of the silicon chunks often occurs in the filling device. This is disadvantageous, since increased shutdown times of the machine are the result.

Instances of penetration of the plastic bag also occur, and this likewise leads to a shutdown of the plant and to contamination of the silicon.

It has also been found that, during the packaging of chunks of a particular size class, for example chunk sizes of 20 to 60 mm, unwanted smaller silicon particles or chunks also arise. The proportion of such unwanted particles for such chunk sizes is 17,000-23,000 ppmw.

Hereinafter, all chunks or particles of silicon having such a size that they can be removed by means of a mesh screen with square meshes of size 8 mm×8 mm are to be referred to as fines. The fines fraction is undesirable to the customer since it adversely affects the customer's operations. If the fines fraction is removed by the customer, for example by screening, this means increased cost and inconvenience.

As well as the automatic packing of polycrystalline silicon, as according to U.S. Pat. No. 7,013,620 B2, manual packing of the polycrystalline silicon in plastic bags is also an option. Manual packing can distinctly reduce the fines fraction, for the abovementioned 20-60 mm chunk size from 17,000 ppmw down to 1400 ppmw.

However, manual packaging means high inconvenience and increased personnel costs. Therefore, manual packing is not an option for economic reasons. In addition, it would be desirable to reduce the fines fraction further than is achievable by manual packing.

It was therefore an object of the invention to automatically pack polycrystalline silicon, and to reduce the fines fraction formed to an exceptionally low level.

DESCRIPTION OF THE INVENTION

The object of the invention is achieved by polycrystalline silicon in the form of chunks packed in plastic bags containing a mass of at least 5 kg, including chunks of size from 20 to 200 mm, wherein any fines fraction of polycrystalline silicon in the plastic bag is less than 900 ppmw, preferably less than 300 ppmw, more preferably less than 10 ppmw.

That polycrystalline silicon preferably comprises chunks of size 45 to 200 mm, wherein the fines fraction of polycrystalline silicon in the plastic bag is less than 600 ppmw, preferably less than 10 ppmw.

The polycrystalline silicon preferably comprises chunks of size 90 to 200 mm, wherein the fines fraction of polycrystalline silicon in the plastic bag is less than 500 ppmw, preferably less than 10 ppmw.

The fines fraction of polycrystalline silicon, in the context of the invention, comprises particles which can be screened off from the chunks present in the plastic bag by means of a mesh screen having a mesh size of 8 mm (square meshes). The fines fraction is quantified by gravimetric means.

Polycrystalline silicon in the form of chunks packed in plastic bags containing a mass of at least 5 kg, including at least 90% by weight of chunks of size from to 40 mm, wherein particles of polycrystalline silicon of size less than 8.3 mm, preferably of size less than 9.5 mm, are present to an extent of less than 10,000 ppmw in the plastic bag.

Polycrystalline silicon in the form of chunks packed in plastic bags containing a mass of at least 5 kg, including at least 90% by weight of chunks of size from to 15 mm, wherein particles of polycrystalline silicon of size less than 3.5 mm, preferably of size less than 3.9 mm, are present to an extent of less than 10,000 ppmw in the plastic bag.

Polycrystalline silicon in the form of chunks packed in plastic bags containing a mass of at least 5 kg, including at least 90% by weight of chunks of size from 1 to 5 mm, wherein particles of polycrystalline silicon of size less than 1 mm are present to an extent of less than 10,000 ppmw in the plastic bag.

The determination of the fines fraction of chunk sizes <=CS2 is effected by means of a commercial particle size measuring instrument, for example a Camsizer® from Retsch. A measure employed for the fines fraction was the 1% by weight quantile (=10,000 ppmw).

The object of the invention is achieved by a process for producing the polycrystalline silicon, comprising the following steps: a) comminuting polycrystalline silicon rods deposited by means of CVD to chunks; b) sorting and classifying polycrystalline silicon chunks into size classes of 20 to not more than 200 mm, 45 to not more than 200 mm, 90 to not more than 200 mm, 10 to 40 mm, 4 to 15 mm or 1 to 5 mm; c) metering polycrystalline silicon chunks by means of a metering unit; d) packing polycrystalline silicon chunks metered to a mass of at least 5 kg by means of a packing unit, by filling into at least one plastic bag; wherein metering unit and packing unit comprise elements which allow, during the metering and during the packing, removal of fines, or of particles of size less than 8.3 mm, or of particles of size less than 3.5 mm, or of particles of size less than 1 mm and wherein the packing unit comprises an energy absorber or a reservoir vessel which enables sliding or slipping of the silicon chunks into the plastic bag, and wherein a gas flow which is generated within the plastic bag after the bag has been filled transports the fines, dust or particles of size less than 1 mm or dust or particles of size less than 3.5 mm, or dust or particles of size less than 8.3 mm, out of the bag, and these are then sucked out with a suction device, in such a way that, after filling of the packing bag, the following fines or particles are present in a packing bag: size class 20 to 200 mm: fines fraction less than 900 ppmw; size class 45 to 200 mm: fines fraction less than 600 ppmw, size class 90 to 200 mm: fines fraction less than 500 ppmw, size class 10 to 40 mm: particles of size less than 8.3 mm, to an extent of less than 10,000 ppmw; size class 4 to 15 mm: particles of size less than 3.5 mm, to an extent of less than 10,000 ppmw; size class 1 to 5 mm: particles of size less than 1 mm to an extent of less than 10,000 ppmw.

The invention proceeds from silicon chunks of particular size classes which have been obtained by comminution of a rod deposited by means of the Siemens process, followed by sorting and classification.

The size class is defined as the longest distance between two points on the surface of a silicon chunk (=max. length):
Chunk size 0 [mm] 1 to 5
Chunk size 1 [mm] 4 to 15
Chunk size 2 [mm] 10 to 40

As well as the aforementioned size classes, the classification and sorting of polycrystalline silicon into the following chunk sizes is likewise customary:
Chunk size 3 [mm] 20 to 60
Chunk size 4 [mm] 45 to 120
Chunk size 5 [mm] 90 to 200

In each case, at least 90% by weight of the chunk fraction is within the size ranges specified.

After sorting and classification, the chunks were packed. They may have been subjected to a cleaning process beforehand. Alternatively, the chunks may be dedusted.

It is preferable to dedust the silicon chunks—as described in US 2010/0052297 A1—and not to subject them to any wet-chemical cleaning operation. Preference is given to dedusting by means of compressed air or dry ice. It is thus possible to remove silicon dust from the chunks.

The treatment of the chunks with compressed air or dry ice should be effected at a pressure of 1 to 50 bar.

The treatment of the chunks should be effected by blowing with compressed air or dry ice with a flow rate of at least 2 m/s. The treatment of the chunks with compressed air or dry ice should be effected for 0.01 to 2000 seconds.

Before being packed, the polycrystalline silicon is first portioned and weighed.

The polysilicon chunks are transported by means of a conveyor channel and separated into coarse and fine chunks by means of at least one screen. They are weighed by means of a metering balance and metered up to a target weight, then removed via a removal channel and transported to a packing unit.

The screen may be a perforated plate, a bar screen, an optopneumatic sorter or another suitable device.

The filling unit is configured such that ultrafine particles and splinters of the polysilicon are removed prior to or during the filling. According to the chunk size, different screens can be used. For chunk sizes of 20 to 200 mm, screens having a screen size of 8 mm are used. This allows fines to be screened off.

For smaller chunk sizes of 1 to 40 mm, it is possible with preference to use screens having smaller screen sizes of less than 7 mm, preferably of 1 to 4 mm. It is thus possible to remove particles of size less than 8.3 mm, preferably less than 9.5 mm, or particles of size less than 3.5 mm, preferably less than 3.9 mm, or particles of size less than 1 mm.

The at least one screen and the metering balance preferably comprise a low-contamination material over at least part of their surfaces, for example a hard metal. Hard metals are understood to mean sintered carbide hard metals. As well as the conventional hard metals based on tungsten carbide, there are also hard metals which include preferably titanium carbide and titanium nitride as hard substances, in which case the binder phase comprises nickel, cobalt and molybdenum.

At least the mechanically stressed, wear-sensitive surface regions of screen and metering balance preferably comprise hard metal or ceramic/carbides. At least one screen is preferably manufactured completely from hard metal.

Screen and metering balance may be provided with a partial or full coating. The coating used is preferably a material selected from the group consisting of titanium nitride, titanium carbide, aluminum titanium nitride and DLC (diamond-like carbon).

The portioning and weighing of the chunk polysilicon is effected by means of a metering unit comprising a conveyor channel suitable for delivering a product stream of chunks, at least one screen suitable for separating the product stream into coarse and fine chunks, a coarse metering channel for coarse chunks and a fine metering channel for fine chunks, and a metering balance for determination of the metered mass, the at least one screen and the metering balance comprising a hard metal over at least part of their surfaces.

Such a metering unit serves to meter polysilicon chunks of a particular size class as exactly as possible prior to packing.

Separation of the product stream into coarse and fine portions enables more exact metering of the polysilicon.

The metering unit preferably comprises two screens, more preferably bar screens.

Coarse or relatively large polysilicon chunks are transported in a coarse metering channel.

Fine or relatively small polysilicon chunks are transported in a fine metering channel.

The size distribution of the polysilicon chunks in the starting material stream depends, inter alia, on the preceding comminution operations. The method of division into coarse and fine chunks and the size of the coarse and fine chunks depend on the desired end product which is to be metered and packed.

A typical chunk size distribution comprises chunks of size 20 to not more than 200 mm.

For example, chunks below a particular size can be removed by means of a screen, preferably by means of a bar screen, in conjunction with a removal channel from the metering unit. It is thus possible to accomplish metering only of chunks of a very particular size class.

The transport of the polysilicon on the conveyor channels again gives rise to unwanted product sizes. These can be removed again, for example, by a removal operation in the metering balance. For this purpose, the balance is equipped with an orifice, an exchangeable removal mechanism and a removal unit.

The smaller chunks removed are classified again, metered and packed in downstream operations, or sent to another use.

It is essential that the metering unit has a fines slide. This may be configured so as to be swivelable. According to the desired target product (chunk size distribution), this is used to screen out fines and to remove them from the product stream for the fines metering.

The metering of the polysilicon via the two metering channels can be automated.

The metering unit additionally enables division of the silicon product stream between several metering and packing systems by means of a regulated swivel channel, and hence combination of several metering systems which are filled with one starting material and, after metering and weighing, are transported to different packing machines.

The metering system includes removal mechanisms (screens) which screen off unwanted smaller product sizes, and then supply them to the upstream processes (screening, classification).

After metering, the chunks are removed via a removal channel and transported to a packing unit.

The packing unit comprises a dispensing apparatus, by means of which the chunks are filled into a plastic bag.

The dispensing apparatus preferably includes a freely suspended energy absorber made of a nonmetallic low-contamination material. The plastic bag is pulled over the energy absorber. For this purpose, for example, an articulated robot is suitable. The polycrystalline silicon is introduced, and the plastic bag is lowered downward during the filling, such that silicon slides into the plastic bag. The presence of the energy absorber prevents penetration of the plastic bag, since it is protected from hard impact of the silicon by the energy absorber. At the same time, the lowering of the plastic bag ensures that no jamming occurs in the energy absorber. The plastic bag is preferably lowered by means of suitable grab systems.

US2010/154357 A1 already discloses using an energy absorber. However, it has been found that it is impossible with the process described therein to achieve filling of the plastic bag with low post-comminution. The lowering of the plastic bag is essential to the success of the invention.

The energy absorber preferably takes the form of a funnel or hollow body, for example a movable flexible tube.

It preferably consists of textile material (for example Gore-Tex® PTFE fabric or polyester/polyamide fabric), plastics (e.g. PE, PP, PA, or copolymers of these plastics). It more preferably consists of an elastomer, for example PU, natural or vulcanized rubber or ethylene-vinyl acetate (EVA), having a Shore A hardness between 30 A and 120 A, preferably 70 A.

If no energy absorber is used, it is possible to provide a reservoir vessel having an orifice through which silicon is introduced, in which case a plastic bag, after the reservoir vessel has been filled with silicon, is pulled over the reservoir vessel and the reservoir vessel is then rotated such that the silicon slides from the reservoir vessel into the plastic bag.

Here, a reservoir vessel is first filled with silicon. For this purpose, the reservoir vessel has at least one orifice through which the silicon is introduced. After the reservoir vessel has been filled, a plastic bag is pulled over the side of the reservoir vessel which has the orifice through which silicon has been introduced. Subsequently, the reservoir vessel is rotated with the plastic bag such that the silicon slides from the reservoir vessel into the plastic bag. For this purpose, the reservoir vessel is, for example, pulled away upward. Here too, it is possible to reliably avoid penetration of the plastic bag, since the distance that the silicon falls to pass from the reservoir vessel to the plastic bag is virtually negligible.

It is likewise possible to use a reservoir vessel having at least two orifices, in which case a plastic bag is pulled over one side of the reservoir vessel comprising one of the at least two orifices, silicon is introduced into the reservoir vessel through the second of the at least two orifices, and the reservoir vessel at least at the start of the filling operation is arranged such that the silicon, in the course of filling, does not at first come into contact with the plastic bag, and only lowering of the plastic bag achieves sliding of the silicon into the plastic bag.

Here, the plastic bag is already pulled over the reservoir vessel at the start of the filling operation. The reservoir vessel in this case has at least two orifices. Silicon is introduced through one orifice. Silicon can slide into the plastic bag through the second orifice. The reservoir vessel and plastic bag are arranged, for example tilted, such that silicon introduced into the reservoir vessel in no case hits or comes into contact immediately with the plastic bag. The silicon first comes into contact with an inner wall of the reservoir vessel. In doing this, it loses kinetic energy and slides slowly through the second orifice into the plastic bag. The reservoir vessel thus likewise serves as a kind of energy absorber.

The reservoir vessel or the energy absorber preferably comprises a balance.

This balance preferably consists of a hard metal or ceramic or carbides.

The preferably prefabricated bag is pulled over the weighing vessel and filled by rotating the entire unit.

The balance preferably takes the form of a screen and is present at one end of the energy absorber or of the reservoir vessel.

Preferably, a shaking mechanism is provided in order to completely rule out jamming and in order to accomplish better removal. Such a shaking mechanism can be obtained, for example, by means of ultrasound. A further preferred embodiment provides a balance with transfer to an energy absorber.

In this case, the plastic bag is pulled over the energy absorber, then the balance including the screen is opened, then a fall arrestor is opened and closed, and then the bag is lowered with wave-like movements and/or shaking.

The fall arrestor used is preferably a device which is pressed against the plastic bag or energy absorber. This at first reduces the cross section of the plastic bag or of the energy absorber, then releases it in a controlled manner.

It is thus possible to control the product flow and achieve filling of the silicon into the prefabricated bag, with generation of only a low level of fines.

After the filling operation the plastic bag is closed.

Beforehand, however, a gas flow is generated within the plastic bag. For this purpose, for example, compressed air can be introduced into the plastic bag. The pressure of the gas introduced for the blowing-out operation is between 1-10 bar, preferably 5 bar. The compressed air can be introduced via a blowing tube or another suitable device. Preference is given to introducing filtered air in order to rule out contamination of the silicon.

The gas or the air is to flow unhindered past the large chunks. It is preferably introduced such that it describes a semicircular path via a first bag flank, the bag base and a second bag flank. The gas or air stream transports dust and small particles out of the bag. Outside the bag, preferably immediately above the bag edge, gas or air stream comprising dust and particles are sucked out by means of a suction device. According to the chunk size classes, the bag opening can be varied in order thus to adjust the blowing-out gap in a suitable manner.

This transports fines or dust or particles of size less than 1 mm or dust or particles of size less than 3.5 mm, preferably less than 3.9 mm, or dust or particles of size less than 8.3 mm, preferably less than 9.5 mm, out of the bag.

The plastic bag preferably consists of a high-purity plastic. It preferably comprises polyethylene (PE), polyethylene terephthalate (PET) or polypropylene (PP), or composite films.

A composite film is a multilayer packing film from which flexible packings are made. The individual film layers are typically extruded or laminated. The packings are used principally in the foods industry.

During filling with chunk polysilicon, the plastic bag is preferably held and pulled downward away from the energy absorber by means of at least two elements on the bag, and, after the filling operation has ended, sent by means of these grips to a closure device, preferably a welding device.

The plastic bag preferably has a thickness of 10 to 1000 µm. The plastic bag can be closed, for example, by means of welding, adhesive bonding, sewing or positive locking. It is preferably effected by means of welding.

In order to ensure that there is no recurrence of post-comminution and formation of fines in the welded plastic bag containing polysilicon in the course of transport to the customer, a further stabilizing packing of the plastic bags is preferred.

For transport purposes, the plastic bag is introduced into a transport vessel, for example a large package, comprising separating elements or boxes. It has been found to be particularly advantageous to provide boxes matched to the dimensions of the plastic bag containing polysilicon. In addition, the plastic bag should be surrounded by a film having a reinforcement structure or by a shaping element. In order to stabilize the packing, it may be advantageous to provide wedge-shaped elements which fit against the upper side and/or against a side wall of the box and against the plastic bag containing polycrystalline silicon. With these measures, it is possible to ensure fixing of the chunks in the course of transport to the customer, such that the formation of new or additional fines in the plastic bag can be avoided.

EXAMPLE

Bags packed in accordance with the invention and, as comparative examples, bags packed by means of the process according to U.S. Pat. No. 7,013,620 B2 and manually packed bags were examined. In each case, bags containing masses of 5 kg and 10 kg with different size classes of chunk sizes CS0 to CS 5 were examined.

To determine the fines fraction of chunk sizes 3 to 5, a mesh screen with 8×8 mm square meshes and vibration motors were used. The fines fraction screened off was quantified gravimetrically (accuracy of detection 10 ppmw).

To determine the fines fraction in chunk size classes 0 to 2, a commercial particle measuring instrument was used. For example, the Camsizer® from RETSCH Technology GmbH is suitable. This individually characterizes the particles by means of camera systems. The measurement unit used for the proportion of fine particles here is the 1% (by weight) quantile.

Table 1 shows the results for chunk size 0 to 2. For chunk size 0, a mean of 1.2106 mm is found. This means that 1% by weight of the bag contents (chunks and smaller particles) has a particle size of less than or equal to 1.21 mm. In other words, this means that particles of size less than 1 mm make up not more than 1% by weight of the bag contents, i.e. less than 1% by weight of the bag contents is outside the chunk size range from 1 to 5 mm.

Compared to the prior art, this means a distinct improvement. Both packing according to U.S. Pat. No. 7,013,620 B2 and manual packing lead to a proportion of unwanted particles of more than 1% by weight.

TABLE 1

| Chunk size | Packing according to U.S. Pat. No. 7,013,620 B2 1% quantile [mm] | Manual packing 1% quantile [mm] | Invention 1% quantile [mm] |
|---|---|---|---|
| CS0 | 0.896 | 0.985 | 1.267 |
| CS0 | 0.975 | 0.978 | 1.171 |
| CS0 | 0.894 | 0.93 | 1.237 |
| CS0 | 0.873 | 0.857 | 1.256 |
| CS0 | 0.934 | 0.987 | 1.122 |
| Mean | 0.9144 | 0.9474 | 1.2106 |

TABLE 1-continued

| Chunk size | Packing according to U.S. Pat. No. 7,013,620 B2 1% quantile [mm] | Manual packing 1% quantile [mm] | Invention 1% quantile [mm] |
|---|---|---|---|
| CS1 | 2.88 | 3.005 | 3.568 |
| CS1 | 2.704 | 2.864 | 3.765 |
| CS1 | 2.941 | 2.989 | 3.688 |
| CS1 | 3.062 | 3.045 | 3.96 |
| CS1 | 2.835 | 2.899 | 3.428 |
| Mean | 2.8844 | 2.9604 | 3.6818 |
| CS2 | 5.572 | 6.254 | 9.044 |
| CS2 | 5.921 | 7.021 | 9.448 |
| CS2 | 5.556 | 6.54 | 8.282 |
| CS2 | 5.78 | 7.131 | 9.59 |
| CS2 | 6.217 | 6.125 | 8.821 |
| Mean | 5.8092 | 6.6142 | 9.037 |

Table 2 shows the results for chunk sizes 3 to 5. Here too, the invention leads to distinct improvements over manual packing.

In the case of chunk size 4, after packing according to U.S. Pat. No. 7,013,620 B2, a fines fraction between 6400 and 3700 ppmw is formed, giving an average of 5280 ppmw.

If, in contrast, chunk size 4 is packed manually, a significant reduction in the fines fraction can be observed. Values between 1100 and 1900 ppmw were measured, averaging 1460 ppmw.

In the case of the procedure according to the invention, values between 0 and 900 ppmw, averaging 340 ppmw, were found. One value was below the detection limit of 10 ppmw.

TABLE 2

| Chunk size | Packing according to U.S. Pat. No. 7,013,620 B2 8 mm screen [ppmw] | Manual packing 8 mm screen [ppmw] | Invention 8 mm screen [ppmw] |
|---|---|---|---|
| CS3 | 22300 | 1700 | 600 |
| CS3 | 16500 | 1600 | 300 |
| CS3 | 17500 | 1600 | 800 |
| CS3 | 17500 | 1400 | 900 |
| CS3 | 20400 | 2050 | 700 |
| Mean | 18840 | 1670 | 660 |
| CS4 | 3700 | 1300 | 500 |
| CS4 | 5200 | 1900 | 600 |
| CS4 | 6400 | 1700 | 400 |
| CS4 | 6300 | 1100 | 200 |
| CS4 | 4800 | 1300 | <10 |
| Mean | 5280 | 1460 | 340 |
| CS5 | 4800 | 1520 | 500 |
| CS5 | 3700 | 1290 | 200 |
| CS5 | 5000 | 1130 | <10 |
| CS5 | 3200 | 1420 | 300 |
| CS5 | 2900 | 1390 | 100 |
| Mean | 3920 | 1350 | 220 |

What is claimed is:

1. A process for producing the polycrystalline silicon in a form of chunks packed in a plastic bag containing a mass of at least 5 kg, wherein the chunks range in size from 20 to 200 mm, and any fines fraction in the plastic bag is less than 900 ppmw, comprising the following steps:
   a) comminuting polycrystalline silicon rods deposited by CVD to chunks;
   b) sorting and classifying the chunks into size classes of 20 to not more than 200 mm, 45 to not more than 200 mm, 90 to not more than 200 mm, 10 to 40 mm, 4 to 15 mm or 1 to 5 mm;
   c) metering polycrystalline silicon chunks by use of a metering unit;
   d) packing polycrystalline silicon chunks metered to a mass of at least 5 kg by use of a packing unit, by filling into at least one plastic bag;
wherein the metering unit and the packing unit comprise elements which allow, during the metering and during the packing, removal of fines, or of particles having a size less than 8.3 mm, and wherein the packing unit comprises an energy absorber or a reservoir vessel which enables sliding or slipping of the silicon chunks into the plastic bag, and wherein a gas flow which is generated within the plastic bag after the bag has been filled transports the fines or dust or particles out of the bag, and the fines or dust or particles are then sucked out with a suction device, in such a way that, after filling of the packing bag, the following fines or particles are present in a packing bag: size class 20 to 200 mm: fines fraction less than 900 ppmw; size class 45 to 200 mm: fines fraction less than 600 ppmw; size class 90 to 200 mm: fines fraction less than 500 ppmw, size class 10 to 40 mm: particles of size less than 8.3 mm, to an extent of less than 10,000 ppmw; size class 4 to 15 mm: particles of size less than 3.5 mm, to an extent of less than 10,000 ppmw; size class 1 to 5 mm: particles of size less than 1 mm to an extent of less than 10,000 ppmw.

2. The process of claim 1, wherein the chunks range in size from 45 to 200 mm, and the fines fraction in the plastic bag is less than 600 ppmw.

3. The process of claim 1, wherein the chunks range in size from 90 to 200 mm, and the fines fraction in the plastic bag is less than 500 ppmw.

4. A process for producing polycrystalline silicon in a form of chunks packed in a plastic bag containing a mass of at least 5 kg, including at least 90% by weight of chunks having a size from 10 to 40 mm, wherein particles of a size less than 8.3 mm are present to an extent of less than 10,000 ppmw in the plastic bag, comprising the following steps:
   a) comminuting polycrystalline silicon rods deposited by CVD to chunks;
   b) sorting and classifying the chunks into size classes of 20 to not more than 200 mm, 45 to not more than 200 mm, 90 to not more than 200 mm, 10 to 40 mm, 4 to 15 mm or 1 to 5 mm;
   c) metering polycrystalline silicon chunks by use of a metering unit;
   d) packing polycrystalline silicon chunks metered to a mass of at least 5 kg by use of a packing unit, by filling into at least one plastic bag;
wherein the metering unit and the packing unit comprise elements which allow, during the metering and during the packing, removal of fines, or of particles having a size less than 8.3 mm, and wherein the packing unit comprises an energy absorber or a reservoir vessel which enables sliding or slipping of the silicon chunks into the plastic bag, and wherein a gas flow which is generated within the plastic bag after the bag has been filled transports the fines or dust or particles out of the bag, and the fines or dust or particles are then sucked out with a suction device, in such a way that, after filling of the packing bag, the following fines or particles are present in a packing bag: size class 20 to 200 mm: fines fraction less than 900 ppmw; size class 45 to 200 mm: fines fraction less than 600 ppmw; size class 90 to 200 mm: fines fraction less than 500 ppmw, size class 10 to 40 mm: particles of size less than 8.3 mm, to an extent of less than 10,000 ppmw; size class 4 to 15 mm: particles of size less than 3.5 mm, to an extent of less than 10,000 ppmw; size class 1 to 5 mm: particles of size less than 1 mm to an extent of less than 10,000 ppmw.

5. A process for producing polycrystalline silicon in a form of chunks packed in a plastic bag containing a mass of at least 5 kg, including at least 90% by weight of chunks having a size from 4 to 15 mm, wherein particles of a size less than 3.5 mm are present to an extent of less than 10,000 ppmw in the plastic bag, comprising the following steps:
- a) comminuting polycrystalline silicon rods deposited by CVD to chunks;
- b) sorting and classifying the chunks into size classes of 20 to not more than 200 mm, 45 to not more than 200 mm, 90 to not more than 200 mm, 10 to 40 mm, 4 to 15 mm or 1 to 5 mm;
- c) metering polycrystalline silicon chunks by use of a metering unit;
- d) packing polycrystalline silicon chunks metered to a mass of at least 5 kg by use of a packing unit, by filling into at least one plastic bag;

wherein the metering unit and the packing unit comprise elements which allow, during the metering and during the packing, removal of fines, or of particles having a size less than 8.3 mm, and wherein the packing unit comprises an energy absorber or a reservoir vessel which enables sliding or slipping of the silicon chunks into the plastic bag, and wherein a gas flow which is generated within the plastic bag after the bag has been filled transports the fines or dust or particles out of the bag, and the fines or dust or particles are then sucked out with a suction device, in such a way that, after filling of the packing bag, the following fines or particles are present in a packing bag: size class 20 to 200 mm: fines fraction less than 900 ppmw; size class 45 to 200 mm: fines fraction less than 600 ppmw; size class 90 to 200 mm: fines fraction less than 500 ppmw, size class 10 to 40 mm: particles of size less than 8.3 mm, to an extent of less than 10,000 ppmw; size class 4 to 15 mm: particles of size less than 3.5 mm, to an extent of less than 10,000 ppmw; size class 1 to 5 mm: particles of size less than 1 mm to an extent of less than 10,000 ppmw.

6. A process for producing polycrystalline silicon in a form of chunks packed in a plastic bag containing a mass of at least 5 kg, including at least 90% by weight of chunks, having a size from 1 to 5 mm, wherein particles of a size less than 1 mm are present to an extent of less than 10,000 ppmw in the plastic bag, comprising the following steps:
- a) comminuting polycrystalline silicon rods deposited by CVD to chunks;
- b) sorting and classifying the chunks into size classes of 20 to not more than 200 mm, 45 to not more than 200 mm, 90 to not more than 200 mm, 10 to 40 mm, 4 to 15 mm or 1 to 5 mm;
- c) metering polycrystalline silicon chunks by use of a metering unit;
- d) packing polycrystalline silicon chunks metered to a mass of at least 5 kg by use of a packing unit, by filling into at least one plastic bag;

wherein the metering unit and the packing unit comprise elements which allow, during the metering and during the packing, removal of fines, or of particles having a size less than 8.3 mm, and wherein the packing unit comprises an energy absorber or a reservoir vessel which enables sliding or slipping of the silicon chunks into the plastic bag, and wherein a gas flow which is generated within the plastic bag after the bag has been filled transports the fines or dust or particles out of the bag, and the fines or dust or particles are then sucked out with a suction device, in such a way that, after filling of the packing bag, the following fines or particles are present in a packing bag: size class 20 to 200 mm: fines fraction less than 900 ppmw; size class 45 to 200 mm: fines fraction less than 600 ppmw; size class 90 to 200 mm: fines fraction less than 500 ppmw, size class 10 to 40 mm: particles of size less than 8.3 mm, to an extent of less than 10,000 ppmw; size class 4 to 15 mm: particles of size less than 3.5 mm, to an extent of less than 10,000 ppmw; size class 1 to 5 mm: particles of size less than 1 mm to an extent of less than 10,000 ppmw.

\* \* \* \* \*